United States Patent

Huang

(10) Patent No.: US 9,114,809 B2
(45) Date of Patent: Aug. 25, 2015

(54) CRUISE CONTROLLER FOR MOTOR VEHICLES AND METHOD OF OPERATING SAME

(75) Inventor: Pei-Shih Huang, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 764 days.

(21) Appl. No.: 12/643,282

(22) Filed: Dec. 21, 2009

(65) Prior Publication Data

US 2010/0100281 A1  Apr. 22, 2010

Related U.S. Application Data

(63) Continuation of application No. PCT/EP2008/004974, filed on Jun. 20, 2008.

(30) Foreign Application Priority Data

Jul. 6, 2007  (DE) .......................... 10 2007 031 542

(51) Int. Cl.
*B60K 31/00* (2006.01)
*B60W 30/14* (2006.01)

(52) U.S. Cl.
CPC ......... *B60W 30/143* (2013.01); *B60W 2510/20* (2013.01); *B60W 2520/125* (2013.01); *B60W 2520/14* (2013.01)

(58) Field of Classification Search
USPC .......... 701/96, 93, 301, 41, 70, 72, 78, 79, 80
See application file for complete search history.

(56) References Cited

U.S. PATENT DOCUMENTS

| | | | | |
|---|---|---|---|---|
| 4,132,284 A * | 1/1979 | Tomecek | ....................... | 180/179 |
| 5,400,864 A * | 3/1995 | Winner et al. | .................. | 701/96 |
| 5,832,402 A | 11/1998 | Brachert et al. | | |
| 6,304,811 B1 * | 10/2001 | Prestl | ............................. | 701/96 |
| 6,984,005 B2 * | 1/2006 | Meyer et al. | .................. | 303/186 |
| 7,321,818 B2 * | 1/2008 | Michi et al. | ..................... | 701/96 |
| 2004/0215384 A1 | 10/2004 | Kummel et al. | | |
| 2007/0213915 A1 * | 9/2007 | Tange et al. | ..................... | 701/96 |

FOREIGN PATENT DOCUMENTS

| | | |
|---|---|---|
| DE | 195 02 954 A1 | 8/1995 |
| DE | 44 46 592 A1 | 6/1996 |
| DE | 10 2005 023 701 A1 | 12/2006 |
| EP | 1 008 482 A2 | 6/2000 |
| EP | 1 077 826 B1 | 2/2001 |

(Continued)

OTHER PUBLICATIONS

German Search Report dated Jun. 12, 2008 with English translation (nine (9) pages).

(Continued)

*Primary Examiner* — Adam Tissot
(74) *Attorney, Agent, or Firm* — Crowell & Moring LLP

(57) ABSTRACT

A cruise controller and method are provided for motor vehicles for the purpose of adjusting the vehicle speed on the basis of a predefined setpoint speed. The cruise controller includes a monitoring device, which is designed to evaluate the vehicle state variables steering wheel angle, lateral acceleration, and/or yaw rate. If one of the evaluated vehicle state variables exceeds a predefined first vehicle state variable limit value, the cruise control function is switched into a standby mode.

13 Claims, 1 Drawing Sheet

(56) References Cited

FOREIGN PATENT DOCUMENTS

| | | | |
|---|---|---|---|
| EP | 1 726 471 A1 | 11/2006 | |
| FR | 2 780 350 A1 | 12/1999 | |
| FR | 2 816 892 A1 | 5/2002 | |
| GB | 2 382 158 A | 5/2003 | |

OTHER PUBLICATIONS

International Search Report dated Sep. 16, 2008 with English translation (six (6) pages).

* cited by examiner

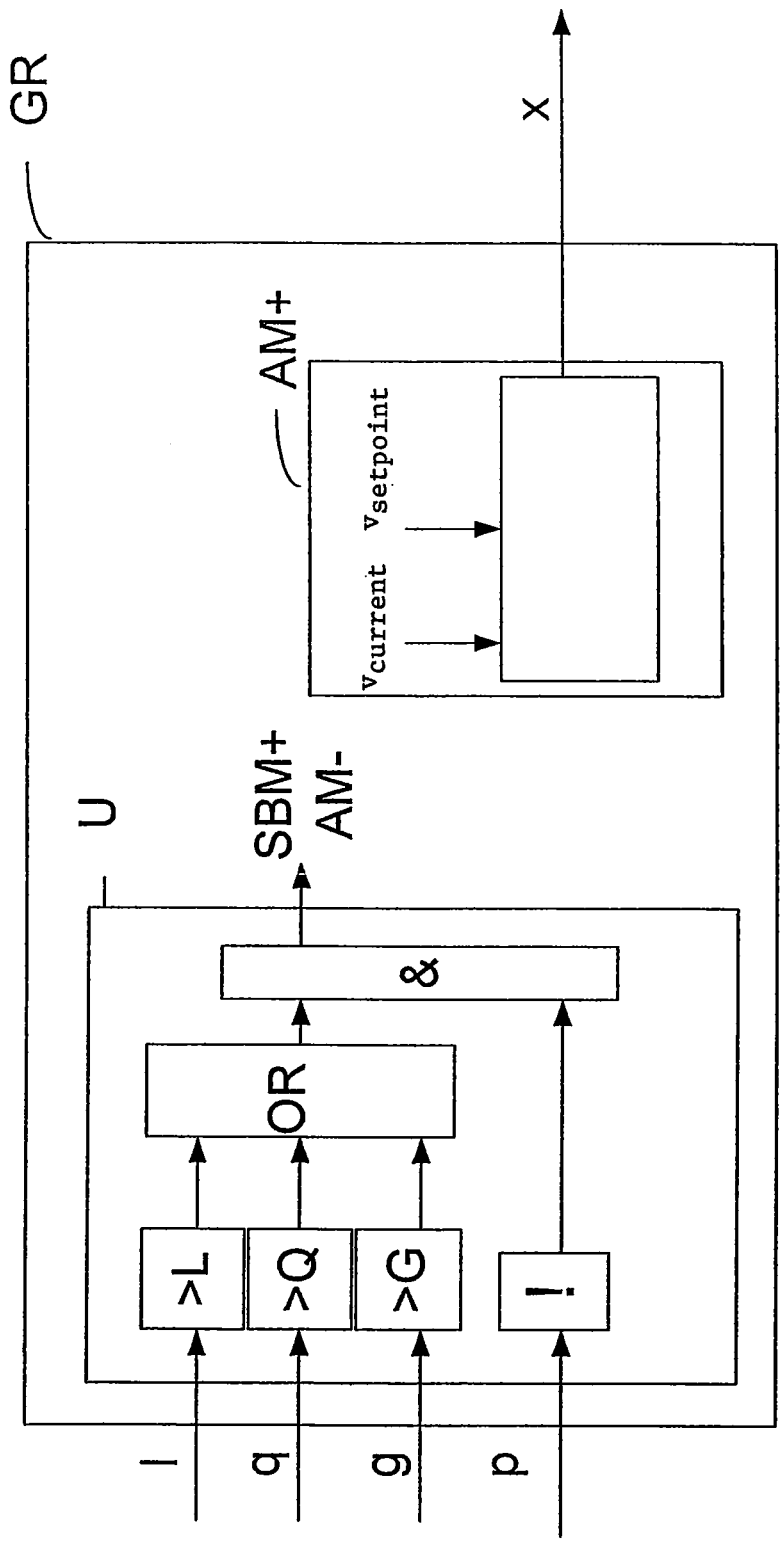

CRUISE CONTROLLER FOR MOTOR VEHICLES AND METHOD OF OPERATING SAME

CROSS-REFERENCE TO RELATED APPLICATIONS

This application is a continuation of PCT International Application No. PCT/EP2008/004974, filed Jun. 20, 2008, which claims priority under 35 U.S.C. §119 from German Patent Application No. DE 10 2007 031 542.4, filed Jul. 6, 2007, the entire disclosures of which are herein expressly incorporated by reference.

BACKGROUND AND SUMMARY OF THE INVENTION

The invention relates to a cruise controller, which is intended for motor vehicles, and which adjusts the speed on the basis of a predefined setpoint speed.

Cruise controllers make it possible to drive at a setpoint speed, which can be adjusted by the driver, so that the driver does not have to constantly preset the speed by use of the gas pedal. These controllers are especially suitable primarily for driving on highways with little traffic congestion, since in such situations driving at a constant speed is often desired.

In addition, such cruise controllers can be equipped with an inter-vehicle distance control function. Basically, in this case the speed is adjusted on the basis of the predefined setpoint speed so long as no vehicle traveling ahead is detected. If, however, a vehicle is travelling ahead of the vehicle equipped with the cruise controller, then the speed is adjusted on the basis of a predefined desired distance, in order to maintain a safety margin in relation to this vehicle that is travelling ahead. In the event that one's own vehicle is following another vehicle (so-called "tailing"), cruise controllers that are expanded to include an inter-vehicle distance control function can adjust to the speed of the vehicle travelling ahead to some extent even up to and out of a stationary state.

In the event that the speed has been adjusted on the basis of a predefined setpoint speed, situations may occasionally arise, in which for safety reasons it would be disadvantageous to adjust the speed on the basis of the predefined speed. For this reason there already exist cruise controllers that are automatically deactivated in the event of a braking action in order to stabilize the operating dynamics.

Moreover, EP 1 726 471 A1 discloses a cruise controller with a monitoring unit for modifying the control function as a function of the condition of the roadway. To this end, the monitoring device is designed to determine and evaluate the roadway condition by way of the measured rotational speed of the wheels. If the differences between the rotational speed of the individual wheels deviate from the typical differences between the rotational speed of the wheels during cornering or owing to the drive slip, then the control function is modified, for example, in the form of switching-off the cruise controller.

Furthermore, DE 195 02 954 A1 discloses a method for controlling the vehicle speed. In this case, the current or stored roadway data about the stretch of road ahead of the vehicle can be used to preset different cruising speeds of the vehicle. Thus, a setpoint speed is determined as a function of the characteristics of the stretch of road that has been traveled and is compared with the setpoint speed that is predefined by the driver. If, for example, the determined setpoint speed, characterizing a curve, drops below the driver's predefined setpoint speed, then the correction factor for controlling the speed is calculated on the basis of the determined, lower setpoint speed.

The object of the invention is to provide a cruise controller, which considers in a simple way the current roadway data during an active cruise control.

This object is achieved by a cruise controller, which is intended for motor vehicles for the purpose of adjusting the speed on the basis of a predefined setpoint speed. The cruise controller includes a monitoring device, which evaluates vehicle state variables in order to modify the cruise control function as a function of the determined roadway data. The monitoring unit is designed to evaluate the current steering wheel angle, the current lateral acceleration, and/or the current yaw rate. Upon exceeding at least one predefined first vehicle state variable limit value by one of the evaluated vehicle state variables, the cruise control function is switched into a standby mode. Advantageous further developments are described herein.

The inventive cruise controller for adjusting the speed on the basis of a predefined setpoint speed is equipped with a monitoring device for evaluating the vehicle state variables. The monitoring unit is designed to evaluate the current steering wheel angle, the current lateral acceleration, and/or the current yaw rate. Upon exceeding at least one predefined first vehicle state variable limit value by one of the evaluated vehicle state variables, the cruise control function is switched into a standby mode. The standby mode is characterized in that although the cruise control system is switched on during this mode, it is not active. That is, the cruise control system is interrupted, and the driver is himself responsible for controlling the travelling speed.

It is possible to determine in a simple way by use of the steering wheel angle, the lateral acceleration, or the yaw rate, whether the vehicle is on a stretch of road, where it is possible under some circumstances that a speed adjustment could lead to critical situations. The said vehicle state variables are a measure for the actual geometric design feature of the lane, in particular, the radius of the curve in that stretch of road, on which the vehicle is currently travelling. If the current steering wheel angle exceeds a predefined first steering angle limit value and/or the current lateral acceleration exceeds a predefined first lateral acceleration limit value and/or the current yaw rate exceeds a predefined first yaw rate limit value, then the cruise controller is switched into a standby mode from its previously active operating mode, the active mode. As long as the driver does not specify a request to accelerate or decelerate, the vehicle is automatically decelerated on the basis of the engine brake and/or the engine drag torque. In this way, it can be guaranteed that the speed of the vehicle is automatically reduced in a simple way to a speed that is adjusted on the basis of this geometric feature of the road, as long as the driver does not do anything. For example, a value of 3 m/s$^2$ can be preset as the first lateral acceleration limit value.

The current steering wheel angle and/or the current lateral acceleration and/or the current yaw rate can be determined through calculation either by use of a sensor, which is provided to this end, or from other signals. The vehicle state variable limit values can be preset in a fixed manner or as a variable, for example, as a function of the current speed.

In order to return from the standby mode into an active mode, in which the adjustment of the speed on the basis of a predefined setpoint speed is active again, there are a variety of alternatives. Hence, in one advantageous embodiment of the cruise controller, the monitoring device automatically switches the cruise control function back into the active mode and/or the originally active operating mode from the standby mode, if none of the evaluated vehicle state variables exceeds the predefined first vehicle state variable limit value or a predefined second vehicle state variable limit value. Thus, each of the evaluated vehicle state variables drops below its second vehicle state variable limit value. The second vehicle state variable limit values can be preset identically to the first vehicle state variable limit values. However, it is advantageous if they are preset so as to be less than the predefined first vehicle state variable limit values, so that the cruise control function is not continuously activated and deactivated. For example, a value of 2 m/s$^2$ can be preset as the second lateral acceleration limit value.

If, therefore, neither the current steering wheel angle exceeds the predefined second steering angle limit value nor the current lateral acceleration exceeds the predefined second lateral acceleration limit value, nor the current yaw rate exceeds the predefined second yaw rate limit value, then the conclusion can be drawn that the vehicle is no longer in a sharp curve and, thus, the speed can be re-adjusted again.

In order to guarantee that the driver is not on a stretch of road that exhibits a plurality of sharp curves in succession and, thus, it would be necessary to switch multiple times from the standby mode into an active mode, one alternative embodiment of the cruise controller provides that the monitoring device does not automatically switch the cruise control function again into an active mode and/or the originally active operating mode from the standby mode until none of the evaluated vehicle state variables (steering wheel angle, lateral acceleration and/or yaw rate) exceeds one of the predefined first or second vehicle state variable limit values for a predefined time interval. Thus, each of the evaluated vehicle state variables falls below its first or second vehicle state variable limit value for a predefined time interval. In this context, the time interval can be preset in a fixed manner or as a variable as a function of the various surrounding parameters of the vehicle or as a function of the determined surrounding parameters (for example, navigation data, type of road).

As an alternative or in addition, a return from the standby mode into an active mode can also occur, if the driver actuates, for example by depressing the gas pedal or not until the actuated gas pedal is released again. Actuating the gas pedal makes it clear that the driver does not perceive or no longer perceives a decrease in speed to be necessary. As a result, the system can be returned again into an active mode.

Depending on the configuration of the controller, a return into the active mode can take place either immediately when the gas pedal is actuated or not until the actuated gas pedal has been released. An immediate return into the active mode upon actuating the gas pedal is usually not noticed by the driver, since in this case the setpoint speed always matches the current speed. As soon as the driver takes his foot from the gas pedal, he will discern the cruise control function, because the speed will be maintained, even though the gas pedal is no longer actuated.

The automatic return option, according to the first or second alternative, can be combined with the driver's consciously initiated return from the standby mode into an active mode in such a way that the actuation of the gas pedal as the return request overlaps the automatic return circuit on undershooting the corresponding vehicle state variable limit values. As soon as the driver steps on the gas pedal, it is detectable that he would like to drive faster again. If the driver releases the actuated gas pedal, the cruise control system can return into an active mode, even if at least one of the vehicle state variables, evaluated in the monitoring unit, exceeds the associated first or second vehicle state variable limit value. This is logical, because the driver should always have control over his vehicle and/or its functions.

If the system returns into the active mode owing to a gas pedal actuation (for example, due to the driver stepping on the gas pedal, or to the driver stepping on the gas pedal and subsequently releasing the gas pedal), even though at least one of the evaluated vehicle state variables exceeds one of the predefined first and/or second vehicle state variable limit values, then the conclusion is drawn that the driver perceives the predefined threshold for the vehicle state variable limit values to be too low. Therefore, when the gas pedal is released, the predefined first and/or second vehicle state variable limit value is (are) replaced. The predefined first or second vehicle state variable limit values can be replaced by the current vehicle state variables or a vehicle state variable that is increased compared to the current vehicle state variable. If the end of the curve and/or the curvilinear stretch of the road is detected with the aid of the current vehicle state variables, then the currently predefined first and second vehicle state variable limit values can be replaced again with the original vehicle state variable limit values.

If the driver does not actuate the gas pedal, the system does not switch back again into an active mode from the standby mode, until all of the evaluated vehicle state variables no longer exceed their predefined first or second vehicle state variable limit value (for a predefined time interval).

The active mode, into which the system returns, can be configured in a variety of ways. Hence, it can be equipped in a first alternative such that after switching back into the active mode—for example, either owing to the current vehicle state variables or owing to the gas pedal being actuated—the predefined setpoint speed of the vehicle at the time prior to the standby mode is preset as the setpoint speed. Then, the cruise controller would be operated again in the active operating mode that was operated prior to the standby mode at the same setpoint speed. The vehicle would be accelerated again on the basis of the original setpoint speed, and on reaching this speed, it would be maintained.

As an alternative, the active mode can also be configured such that when the system returns from the standby mode, the current speed is preset as the setpoint speed. In this way it can be guaranteed that in the event that the standby mode was active for a prolonged period of time, the driver will not become irritated due to a sudden acceleration.

As an alternative, the presetting of the setpoint speed upon returning into an active mode can also depend on the reason for switching back into the active mode. Hence, for example, in the event of a short term actuation by means of the gas pedal and, as a result, the return into the active mode, the original setpoint speed can be preset as the setpoint speed. If the driver actuates the gas pedal for a longer period of time, then the current speed at the time after the gas pedal has been released can be preset as the setpoint speed. Similarly, in the event of an automatic return into the active mode, the setpoint speed can be preset as a function of the duration of the standby mode. If the standby mode was active for just a short period of time, then the originally predefined setpoint speed can be preset as the setpoint speed. If the standby mode persists for a longer period of time, then the current speed can be preset as the setpoint speed.

As an alternative, the setpoint speed could also be preset from the difference between the current speed and the original setpoint speed.

Other objects, advantages and novel features of the present invention will become apparent from the following detailed description of one or more preferred embodiments when considered in conjunction with the accompanying drawing.

BRIEF DESCRIPTION OF THE DRAWING

The single figure depicts a simplified configuration of a cruise controller, according to an embodiment of the invention.

DETAILED DESCRIPTION OF THE DRAWING

The figure depicts a cruise controller GR, which can be operated in an active mode AM and a standby mode SBM. If the active mode AM is active, thus, AM+, then the current speed $V_{current}$ is adjusted on the basis of a predefined setpoint speed $v_{setpoint}$ by outputting a corresponding correction factor x.

A monitoring unit U monitors and evaluates the vehicle state variables steering angle l, lateral acceleration q, and yaw rate g. At the same time, the actuation of the gas pedal p is monitored and evaluated.

If the steering angle l exceeds a predefined first steering angle limit value L or the lateral acceleration q exceeds a predefined first lateral acceleration limit value Q or the yaw rate g exceeds a predefined first yaw rate limit value G, and if there is no gas pedal actuation p (depressing and releasing of the gas pedal), then the monitoring unit U switches into a standby mode SBM+. As a result, the active mode is deactivated, thus, AM−. In the standby mode SBM+, no speed adjustment takes place. That is, no correction factor x is outputted.

As soon as the actuation of the gas pedal p is detected, that is, the gas pedal is depressed and, optionally, the gas pedal is subsequently released, the system switches again into the active mode AM from the standby mode SBM. At the same time, the current speed $v_{current}$ at the time after the gas pedal actuation p has been released is preset as the setpoint speed $v_{setpoint}$, and a corresponding correction factor x is output. It is advantageous if the predefined first vehicle state variable limit values—thus, the first steering angle limit value L, the first lateral acceleration limit value Q and the first yaw rate limit value G—can be replaced by the current vehicle state variables (thus, the steering angle l, the lateral acceleration q and the yaw rate g) at the time that the gas pedal p is released or can be replaced by a vehicle state variable value that is increased by an offset value, if the current vehicle state variables l, q or g exceed the predefined vehicle state variable limit value L, Q, or G.

If on exceeding the vehicle state variable limit values, the gas pedal p is not actuated, then the system does not return again into the active mode AM until none of the vehicle state variables l, q, and g exceeds one of the predefined first vehicle state variable limit values L, Q or G.

In summary, the invention offers the advantage that the current roadway data can be considered in a simple way during cruise control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cruise controller for a motor vehicle comprising:
a monitoring device operatively configured to evaluate vehicle state variables in order to modify a cruise control function as a function of determined roadway data, wherein the cruise control function, while in an active mode, maintains the speed of the motor vehicle based only on a predefined setpoint speed so long as an operator of the motor vehicle does not specify a request to accelerate or decelerate the motor vehicle, and wherein the monitoring device is further configured to evaluate as said vehicle state variables each of a current steering wheel angle, a current lateral acceleration of the vehicle, and a current yaw rate of the vehicle; and
wherein when at least one of said evaluated vehicle state variables exceeds a predefined first vehicle state variable limit value, the cruise controller is configured to switch the cruise control function into a standby mode of operation, and wherein the monitoring device is configured to automatically switch the cruise control function into an active mode from the standby mode in response to determining that no evaluated vehicle state variable exceeds a corresponding predefined second vehicle state variable limit value for each respective evaluated vehicle state variable.

2. The cruise controller according to claim 1, wherein the monitoring device is configured to automatically switch the cruise control function into an active mode from the standby mode if no evaluated vehicle state variable exceeds the predefined first or second vehicle state variable limit value for a predefined time interval.

3. The cruise controller according to claim 1, wherein the monitoring device is configured to switch the cruise control function into an active mode from the standby mode if one of a gas pedal actuation signal or an actuated gas pedal release signal is received by the cruise controller.

4. The cruise controller according to claim 3, wherein upon receiving the actuated gas pedal release signal, the cruise controller is configured to replace the predefined first vehicle state variable limit value with a correspondingly current vehicle state variable if the current vehicle state variable is greater than the predefined first vehicle state variable limit value.

5. The cruise controller according to claim 1, wherein upon receiving the actuated gas pedal release signal, the cruise controller is configured to replace at least one of the predefined first and second vehicle state variable limit values with the correspondingly current vehicle state variable if the current vehicle state variable is greater than the currently predefined first or second vehicle state variable limit value.

6. The cruise controller according to claim 3, wherein upon receiving the actuated gas pedal release signal, the cruise controller is configured to replace the predefined first vehicle state variable limit values with a vehicle state variable that is increased in comparison to the current vehicle state variable if the current vehicle state variable is greater than the currently predefined first vehicle state variable limit value.

7. The cruise controller according to claim 1, wherein after the actuated gas pedal release signal is received, the cruise controller is configured to replace at least one of the predefined first and second vehicle state variable limit values with a vehicle state variable that is increased compared to the current vehicle state variable if the current vehicle state variable is greater than the currently predefined first or second vehicle state variable limit value.

8. The cruise controller according to claim 1, wherein after switching back into the active mode, the cruise controller is configured to preset the current speed or the predefined setpoint of the vehicle from a time prior to the standby mode as the predefined setpoint speed.

9. A method of operating a cruise control of a motor vehicle, the method comprising the acts of:

receiving as vehicle state variables providing roadway data a current steering wheel angle signal, a current lateral acceleration signal, and a current yaw rate signal;

determining whether a predefined first vehicle state variable limit value for a vehicle state variable is exceeded by an associated one of the evaluated vehicle state variables;

upon determining that the predefined first vehicle state variable limit value is exceeded by the associated one of the evaluated vehicle state variables, switching a cruise control function from an active mode into a standby mode, wherein the cruise control function, while in the active mode, maintains the speed of the motor vehicle based only on a predefined setpoint speed so long as an operator of the motor vehicle does not specify a request to accelerate or decelerate the motor vehicle; and switching the cruise control function automatically from the standby mode into the active mode in response to determining that no evaluated vehicle state variable exceeds a corresponding predefined second vehicle state variable limit value for each respective evaluated vehicle state variable.

10. The method according to claim 9, wherein the cruise control function is switched into the active mode from the standby mode if none of the evaluated vehicle state variables exceeds the respective predefined first or second vehicle state variable limit value for a predefined time interval.

11. The method according to claim 9, further comprising the acts of:

receiving at least one of a gas pedal actuation signal or an actuated gas pedal release signal; and switching the cruise control function from the standby mode into the active mode upon receipt of one of said gas pedal actuation signal or said actuated gas pedal release signal.

12. The method according to claim 11, further comprising the acts of:

upon receiving the actuated gas pedal release signal, replacing at least one of the predefined first and second vehicle state variable limit values by at least one of:

(a) a correspondingly current vehicle state variable, and (b) a vehicle state variable that is increased compared to the current vehicle state variable;

if the current vehicle state variable is greater than the respective currently predefined first or second vehicle state variable limit value.

13. The method according to claim 9, wherein after switching back into the active mode, the current speed or the predefined setpoint speed of the vehicle at a time prior to the standby mode is preset as the predefined setpoint speed.

\* \* \* \* \*